United States Patent
Fujiki (10) Patent No.: US 12,058,793 B2
(45) Date of Patent: Aug. 6, 2024

(54) DISPLAY DEVICE, DISPLAY SYSTEM, AND METHOD OF CONTROLLING DISPLAY DEVICE

(71) Applicant: ALPS ALPINE CO., LTD., Tokyo (JP)

(72) Inventor: Takashi Fujiki, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 79 days.

(21) Appl. No.: 18/155,969

(22) Filed: Jan. 18, 2023

(65) Prior Publication Data
US 2023/0300961 A1  Sep. 21, 2023

(30) Foreign Application Priority Data
Mar. 16, 2022 (JP) .................... 2022-041775

(51) Int. Cl.
*H05B 45/30* (2020.01)
*B60Q 3/283* (2017.01)
*B60Q 3/80* (2017.01)
*H05B 45/325* (2020.01)
*H05B 45/50* (2022.01)

(52) U.S. Cl.
CPC ............. *H05B 45/50* (2020.01); *B60Q 3/283* (2017.02); *B60Q 3/80* (2017.02); *H05B 45/325* (2020.01)

(58) Field of Classification Search
CPC ...... H05B 45/30; H05B 45/325; H05B 45/50; H05B 47/10; B60Q 3/80; B60Q 3/283
See application file for complete search history.

(56) References Cited

U.S. PATENT DOCUMENTS 9,635,744 B2 * 4/2017 Xu .................. H05B 45/20

FOREIGN PATENT DOCUMENTS

JP    2012-003864    1/2012

* cited by examiner

*Primary Examiner* — Jimmy T Vu
(74) *Attorney, Agent, or Firm* — IPUSA, PLLC (57) ABSTRACT

A display device includes: a first light emitting diode configured to illuminate a first display; a first power control circuit configured to control power supply to the first light emitting diode; a first lighting control circuit configured to execute lighting control of the first light emitting diode; a first monitor circuit configured to monitor a first lighting state of the first light emitting diode; and first control circuitry including a memory and a processor, configured to execute determining, based on an output of the first monitor circuit, whether the first lighting state is abnormal, and controlling permission or non-permission of power supply to a second light-emitting diode of a display device that is used as the second display device, based on a determination result of the determining.

9 Claims, 4 Drawing Sheets

DISPLAY DEVICE, DISPLAY SYSTEM, AND METHOD OF CONTROLLING DISPLAY DEVICE

CROSS-REFERENCE TO RELATED APPLICATIONS

The present application is based upon and claims priority under 35 U.S.C. § 119 to Japanese Patent Application No. 2022-041775 filed on Mar. 16, 2022, the entire contents of which are incorporated herein by reference.

BACKGROUND OF THE INVENTION

1. Field of the Invention

The present disclosure relates to a display device, a display system, and a method of controlling a display device.

2. Description of the Related Art

Conventionally, there has been an LED lighting monitor control system that monitors the lighting state of LEDs, lighting abnormality, and circuit abnormality; outputs the monitor signal to an external higher-level device; and is capable of lighting control of lights by an external signal from the higher-level device (e.g., see Japanese Laid-Open Patent Application No. 2012-3864).

Meanwhile, it has not been disclosed two display devices that control each other to permit lighting of LEDs, to detect erroneous lighting and circuit abnormality so as to turn the LEDs out forcibly.

SUMMARY OF THE INVENTION

A display device according to an embodiment in the present disclosure includes: a first light emitting diode configured to illuminate a first display; a first power control circuit configured to control power supply to the first light emitting diode; a first lighting control circuit configured to execute lighting control of the first light emitting diode; a first monitor circuit configured to monitor a first lighting state of the first light emitting diode; and first control circuitry including a memory and a processor, configured to execute determining, based on an output of the first monitor circuit, whether the first lighting state is abnormal, and controlling permission or non-permission of power supply to a second light-emitting diode of a display device that is used as the second display device, based on a determination result of the determining.

DESCRIPTION OF THE PREFERRED EMBODIMENTS

In the following, embodiments will be described in which a display device, a display system, a method of controlling a display device, and a method of controlling a display system according to the present disclosure are applied.

According to an embodiment, a display device, a display system, a method of controlling display devices, and a method of controlling a display system are provided, that can turn off lighting of light-emitting diodes, in which two display devices that are capable of illuminating respective two display units arranged on a steering wheel, execute indirect mutual monitoring by executing control of lighting or lights-out of light-emitting diodes that illuminate the two display units, and in the case of detecting erroneous lighting or circuit abnormality, forcibly turn the light-emitting diodes out.

In addition, a display device, a display system, a method of controlling a display device, and a method of controlling a display system are provided, that can suppress erroneous lighting without having a multiplexed structure for preventing malfunction by mutually controlling permission in two display devices that are capable of illuminating two display units arranged on a steering wheel.

EMBODIMENTS

Figure 1:
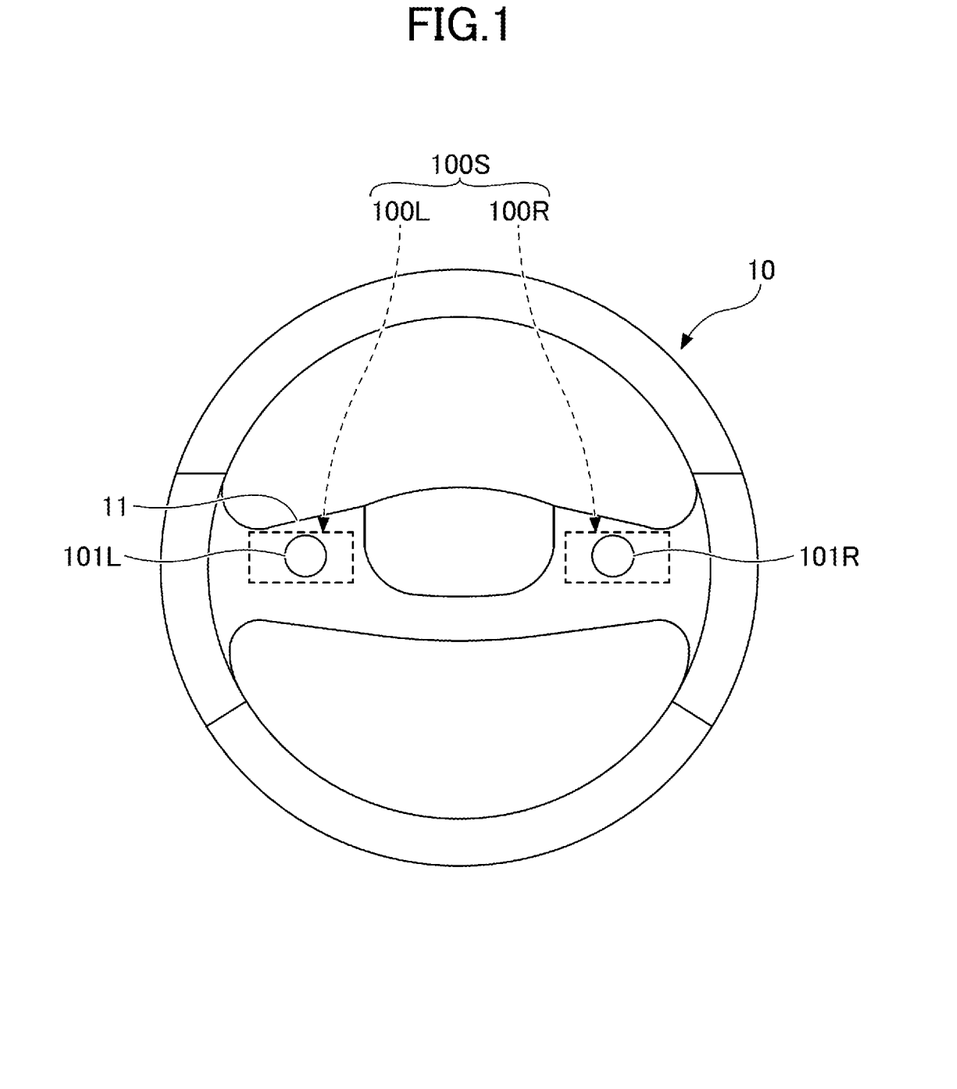
FIG. 1 illustrates a steering wheel 10 having a display system 100S installed according to an embodiment.

FIG. 1 illustrates diagram of a steering wheel 10 having a display system 100S installed according to an embodiment, as viewed from the driver's seat side. A display system 100S includes display devices 100L and 100R. As illustrated in FIG. 1, the steering wheel 10 is installed in a vehicle as an example, and display devices 100L and 100R are installed inside left and right spokes 11, respectively. The display devices 100L and 100R have display units 101L and 101R, respectively, and the display units 101L and 101R are exposed on the surfaces of the left and right spokes 11, respectively. Note that the left and right directions mean the right side and the left side, respectively, toward the surface of the paper showing FIG. 1.

The display device 100L provided in the left spoke 11 is an example of a first display device, and the display device 100R provided in the right spoke 11 is an example of a second display device.

The display unit 101L is an example of a first display, and the display unit 101R is an example of a second display. Note that the display devices 100L and 100R have the same configuration; therefore, the display device 100R may be an example of a first display device, and the display unit 101R may be an example of a first display; and the display device 100L may be an example of a second display device, and the display unit 101L may be an example of a second display.

The display devices 100L and 100R have LEDs (light emitting diodes). The LEDs are positioned on the respective rear sides of the display units 101L and 101R. The rear sides of display units 101L and 101R correspond to the far side in the direction that penetrates vertically through the surface of the paper showing FIG. 1, and as well, the interior side of the spokes 11 opposite to the driver's seat side of the display units 101L and 101R.

The display units 101L and 101R have transparent parts to present shapes of symbols and indicators that represent operating states of devices installed in the vehicle, and are configured such that when being illuminated by the LEDs on the rear side, the symbols and indicators are illuminated to be visible from the driver's seat side by transmitted light. Note that the symbols are letters and symbols that represent the operating states of devices installed in the vehicle. Here, although a form in which symbols on the display units 101L and 101R are identical will be described, the symbols on the display units 101L and 101R may be different. The indicators are letters or symbols indicating states of the parts of the vehicle.

<Configuration of In-Vehicle System 200 Including Display Devices 100L and 100R>

Figure 2:
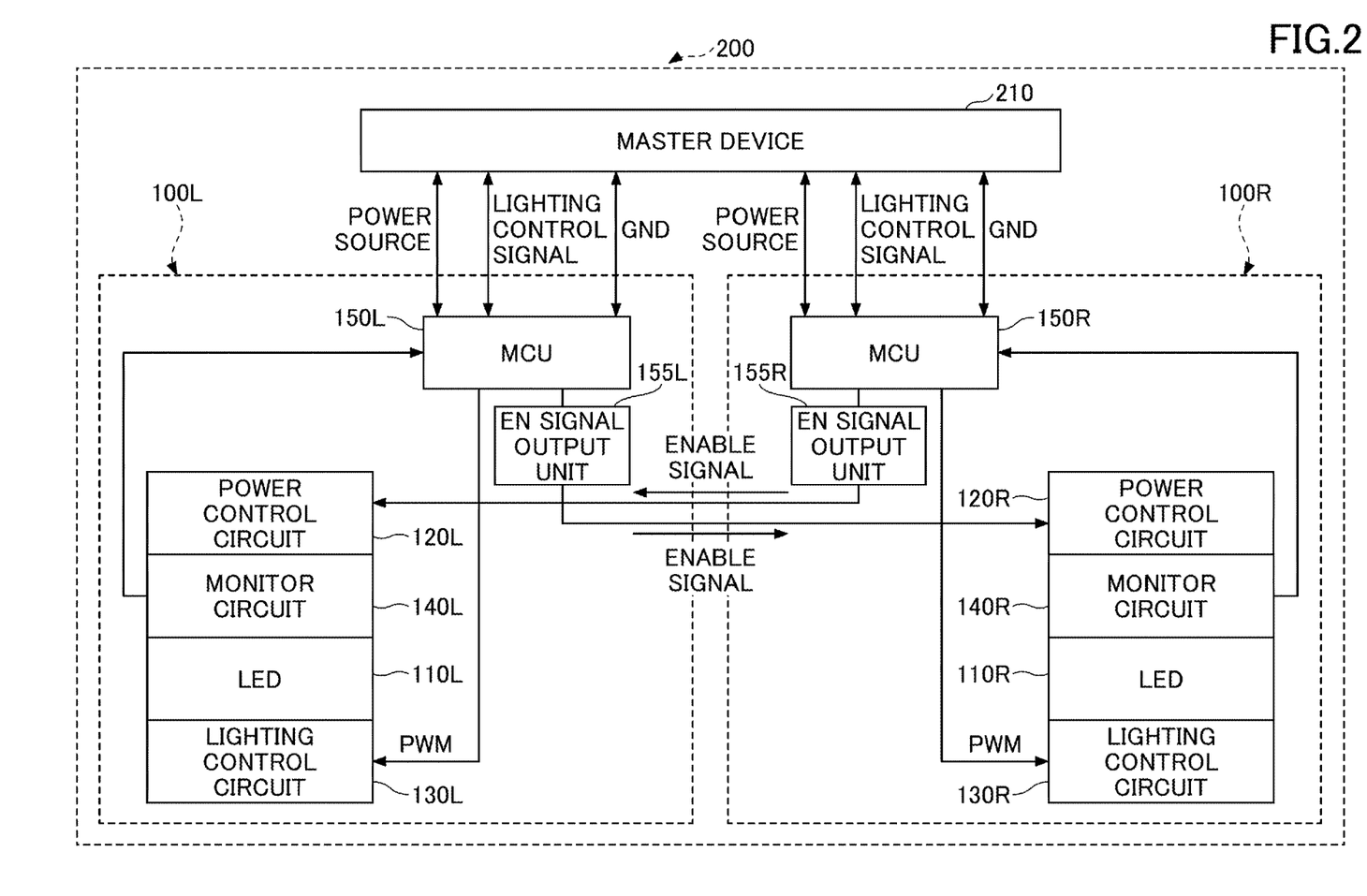
FIG. 2 is a block diagram illustrating an example of a configuration of an in-vehicle system 200.

FIG. 2 is a block diagram illustrating an example of a configuration of an in-vehicle system 200. The in-vehicle system 200 includes the display devices 100L and 100R and a master device 210. The master device 210 is, for example, an ECU (electronic control unit) installed in the vehicle, to control lighting or lights-out of the LEDs 110L and 110R on the display devices 100L and 100R. The display devices 100L and 100R and the master device 210 are communicably connected by a local interconnect network (LIN) as an example.

The display devices 100L and 100R (display system 100S) are devices that cause both of the LEDs 110L and 110R to be lit (turned on), which is the basic lighting state. The lighting state of the LED 110L with brightness based on a command from the master device 210 is an example of a first lighting state, and the lighting state of the LED 110R with brightness based on a command from the master device 210 is an example of a second lighting state.

Lighting of the LEDs 110L and 110R that occurs not in the first lighting state or second lighting state based on a command from the master device 210 is an example of an abnormal lighting state.

<Configuration of Display Device 100L>

The display devices 100L and 100R have the same configuration. The display device 100L includes the LED 110L, a power control circuit 120L, a lighting control circuit 130L, a monitor circuit 140L, an MCU (microcontroller unit) 150L, and an enable signal output unit (EN signal output unit) 155L. Similarly, the display device 100R includes the LED 110R, a power control circuit 120R, a lighting control circuit 130R, a monitor circuit 140R, an MCU 150R, and an enable signal output unit (EN signal output unit) 155R.

The LED 110L is an example of a first light-emitting diode, the power control circuit 120L is an example of a first power control circuit, and a MOSFET 131L of the lighting control circuit 130L and a drive control unit 151L of the MCU 150L constitute an example of a first lighting control circuit. The monitor circuit 140L is an example of a first monitor circuit. The LED 110R is an example of a second light-emitting diode, the power control circuit 120R is an example of a second power control circuit, and a MOSFET 131R of the lighting control circuit 130R and a drive control unit 151R of the MCU 150R constitute an example of a second lighting control circuit. The monitor circuit 140R is an example of a second monitor circuit. Note that the display device 100R may be an example of a first display device, and the display unit 101R may be an example of a first display; in this case, the first and second of the respective elements may be swapped.

Figure 3:
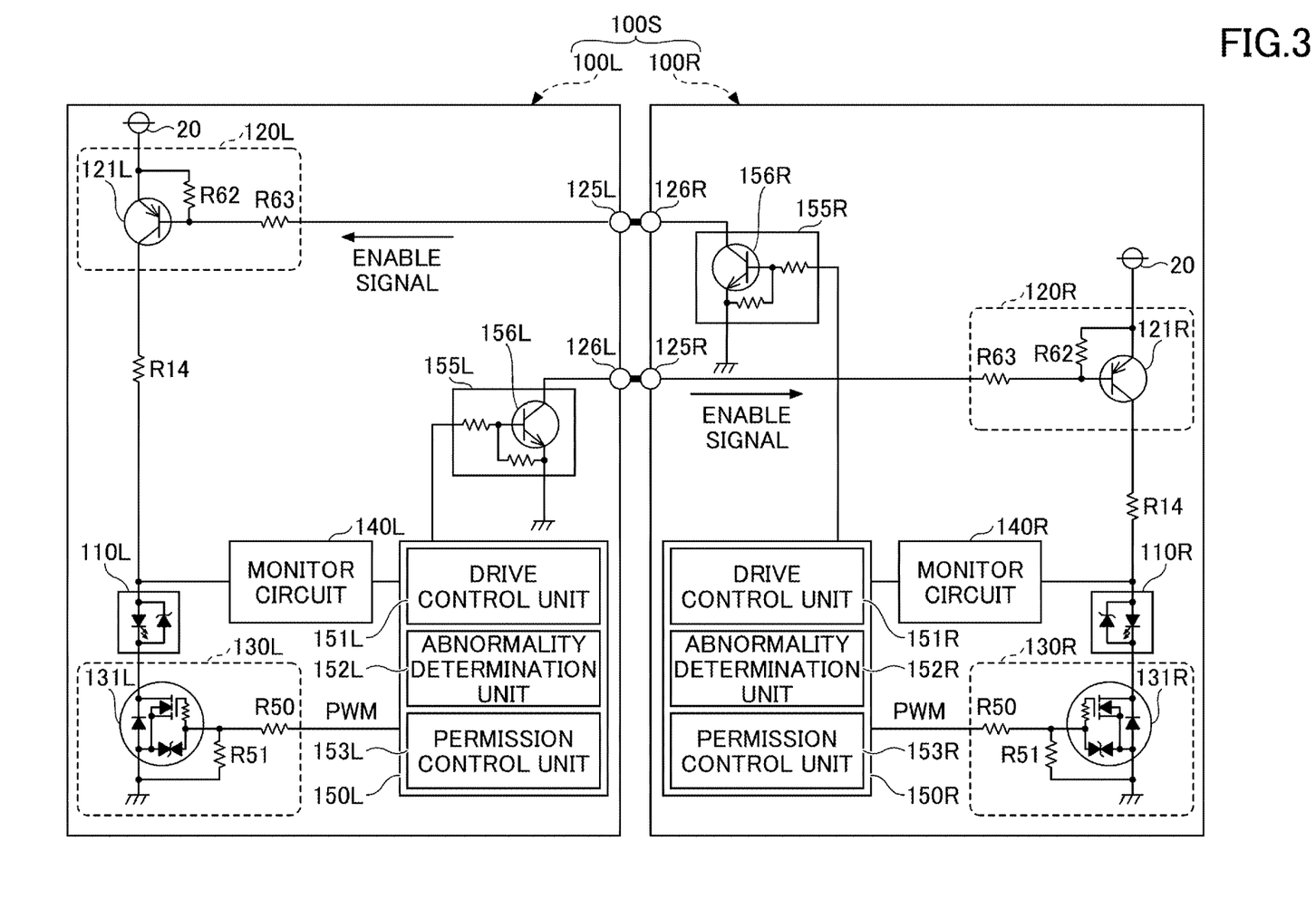
FIG. 3 illustrates an example of a circuit configuration of display devices 100L and 100R.

Here, in addition to FIG. 2, FIG. 3 will be used for description. FIG. 3 illustrates an example of a circuit configuration of the display devices 100L and 100R. As the display devices 100L and 100R have the same circuit configuration, here, the display device 100L will be described. FIG. 3 illustrates a power supply terminal 20. The power supply terminal 20 is connected to a power supply such as a battery of the vehicle, and as an example, is a terminal supplied with 12V DC power.

The display devices 100L and 100R have the same configuration, in which a terminal 125L of the display device 100L is connected to a terminal 126R of the display device 100R, and receives as input an enable signal output from the enable signal output unit 155R. In addition, a terminal 125R of the display device 100R is connected to a terminal 126L of the display device 100L, and receives as input an enable signal output from the enable signal output unit 155L.

The LED 110L is connected between the power supply terminal 20 and the ground as an example of a reference potential point. A line between the power supply terminal 20 to which the LED 110L is connected and the ground is a current supply path to supply a current to the LED 110L as an example of a first current supply path.

The power control circuit 120L includes a PNP-type transistor 121L. The transistor 121L is an example of a first power control element. The transistor 121L includes an emitter connected to the power supply terminal 20, a collector connected to the anode of the LED 110L, and a base connected to the terminal 125L. The terminal 125L is connected to the enable signal output unit 155R of the display device 100R via the terminal 126R. A resistor R62 is connected between the emitter and the base of the transistor 121L so as to cause the transistor 121L to operate properly; a resistor R14 is connected between the collector and the anode of the LED 110L so as to flow an appropriate current to the LED 110L; and a resistor R63 is connected between the base and the terminal 125L so as to properly restrict the base current of the transistor 121L.

The power control circuit 120L enables the power to be supplied from the terminal 20 the LED 110L when the transistor 121L is turned on by the enable signal output from the enable signal output unit 155R of the display device 100R to the terminal 125L via the terminal 126R, and disables the power to be supplied from the terminal 20 to the LED 110L when turned off by the enable signal output from the enable signal output unit 155R of the display device 100R to the terminal 125L via the terminal 126R. In this way, the power control circuit 120L controls the power supply to the LED 110L.

The lighting control circuit 130L includes a MOSFET (metal oxide semiconductor field effect transistor) 131L. The MOSFET 131L is an example of a first lighting switching element connected in series to the LED 110L. The MOSFET 131L includes a drain connected to the cathode of the LED 110L, a source connected to the ground, and a gate connected to the MCU 150L. In order to have the MOSFET 131L operate properly, a resistor R51 is connected between the gate and the source, and a resistor R50 is connected between the gate and the MCU 150L.

The lighting control circuit 130L executes lighting control of the LED 110L by having the MOSFET 131L to be driven with PWM (pulse width modulation) by the drive control unit 151L of the MCU 150L, in a state where power can be supplied from the power supply terminal 20 to the LED 110L by the power control circuit 120L. Lighting control by driving with PWM can adjust, in addition to lighting or lights-out control, the brightness of the LED 110L by changing the duty ratio.

The monitor circuit 140L is connected between the anode of the LED 110L and the MCU 150L, to monitor the lighting state of the LED 110L by monitoring the voltage applied to the LED 110L. The monitor circuit 140L converts a current flowing to the anode of the LED 110L into a voltage, and inputs the voltage to the MCU 150L as a lighting state signal indicating the lighting state. The lighting state signal is used for monitoring abnormality in the lighting state of the LED 110L.

The MCU 150L is a microcontroller implemented by a computer that includes a CPU (Central Processing Unit), a RAM (Random Access Memory), a ROM (Read-Only Memory), an input/output interface, an internal bus, and the like. The MCU 150L includes a drive control unit 151L, an abnormality determination unit 152L, and a permission control unit 153L.

The drive control unit 151L, the abnormality determination unit 152L, and the permission control unit 153L of the MCU 150L are examples of a first drive controller, a first abnormality determiner, and a first permission controller, respectively. The drive control unit 151L, the abnormality determination unit 152L, and the permission control unit 153L represent functions of a program executed by the MCU 150L, as functional blocks.

The drive control unit 151L sets the duty ratio of the PWM based on the lighting control signal transmitted from the master device 210, and executes the PWM driving of the LED 110L.

The abnormality determination unit 152L determines abnormality in the lighting state of the LED 110L, based on the lighting state signal input from the monitor circuit 140L. The abnormality determination unit 152L executes monitoring all the time even when no abnormality occurs. The abnormality determination unit 152L determines that the lighting state of the LED 110L is normal (not abnormal) in the case where power is supplied from the power supply terminal 20 to the LED 110L by the power control circuit 120L, the PWM driving of the LED 110L is executed by the drive control unit 151L, and the LED 110L is lighting with a predetermined brightness.

In addition, for example, the abnormality determination unit 152L determines that the lighting state of the LED 110L is abnormal in the case where power is supplied from the power supply terminal 20 to the LED 110L by the power control circuit 120L, but the LED 110L is lighting even though the PWM driving of the LED 110L is not executed by the drive control unit 151L. In addition, the abnormality determination unit 152L determines that the lighting state of the LED 110L is abnormal also in the case where the LED 110L is lighting even though power is not supplied from the power supply terminal 20 to the LED 110L by the power control circuit 120L, or in the case where power is supplied from the power supply terminal 20 to the LED 110L by the power control circuit 120L, but the LED 110L is not lighting even though the PWM driving of the LED 110L is executed by the drive control unit 151L.

The permission control unit 153L controls permission or non-permission of the power supply to the LED 110R of the display device 100R, based on a determination result of the abnormality determination unit 152L. The permission control unit 153L causes the enable signal output unit 155L to output an enable signal in order to permit the power supply to the LED 110R of the display device 100R, except when the display device 100L is initialized immediately after the ignition of the vehicle is turned on, and when the lighting state of the LED 110L is determined to be abnormal by the abnormality determination unit 152L. The enable signal is a signal controlling the transistor 121R, that is output to the terminal 125R of the display device 100R via the terminal 126L, and is input into the base of the PNP-type transistor 121R of the power control circuit 120R. As a result, the transistor 121R of the power control circuit 120R of the display device 100R is turned on by the enable signal, and it transitions to a state where power can be supplied from the power supply terminal 20 to the LED 110R.

On the other hand, in the case where the lighting state of the LED 110L is determined to be abnormal by the abnormality determination unit 152L, the permission control unit 153L prevents the enable signal output unit 155L from outputting an enable signal so as not to permit the power supply to the LED 110R of the display device 100R. As a result, the transistor 121R of the power control circuit 120R of the display device 100R is turned off by the enable signal, and it transitions to a state where the power supply from the power supply terminal 20 to the LED 110R is disabled, and the LED 110R is forcibly turned out.

Accordingly, through the lighting state signal from the monitor circuit 140R, the MCU 150R of the display device 100R determines that the abnormality determination unit 152R is abnormal because the LED 110R is in a lights-out state even though the lighting state is recognized as normal, and the permission control unit 153R prevents the enable signal output unit 155R from outputting an enable signal. As a result, the display device 100L transitions to a state where the power supply to the LED 110L is disabled, and the LED 110L is forcibly turned out.

The enable signal output unit 155L is connected between the MCU 150L and the terminal 126L, and includes an NPN-type transistor 156L. The transistor 156L includes a collector connected to the terminal 126L, an emitter connected to the ground, and a base connected to the MCU 150L. The voltage of the base is controlled by the permission control unit 153L.

When the transistor 156L is turned on by the permission control unit 153L, the enable signal output unit 155L outputs an enable signal to the power control circuit 120R, that is output to the terminal 125R of the display device 100R via the terminal 126L. On the other hand, when the transistor 156L is turned off by the permission control unit 153L, the enable signal output unit 155L stops outputting the enable signal. When the output of the enable signal is stopped, the transistor 121R of the power control circuit 120R becomes turned off.

Here, although the display device 100L has been described using FIGS. 2 and 3, the display devices 100L and 100R have the same configuration and are symmetrically connected by having the terminals 125L and 126R connected and having the terminals 126L and 125R connected. Therefore, the display device 100R operates in substantially the same way as the display device 100L described above.

Note that in the display device 100R, the power control circuit 120R includes a PNP-type transistor 121R. The transistor 121R is an example of a second power control element. The lighting control circuit 130R includes a MOSFET 131R. The MOSFET 131R is an example of a second lighting switching element connected in series to the LED 110R.

In addition, the MCU 150R includes a drive control unit 151R, an abnormality determination unit 152R, and a permission control unit 153R. The drive control unit 151R, the abnormality determination unit 152R, and the permission control unit 153R are examples of a second drive controller, a second abnormality determiner, and a second permission controller, respectively. The MOSFET 131R and the drive control unit 151R constitute an example of a second lighting control circuit. In addition, the enable signal output unit 155R is connected between the MCU 150R and the terminal 126R, and includes an NPN-type transistor 156R.

The display devices 100L and 100R are devices that have the basic lighting state of lighting both the LEDs 110L and 110R, and prevent only one of the LEDs 110L and 110R is lighting.

In order to achieve this, the display devices 100L and 100R control each other to permit or not to permit the output of the enable signal, in order to switch between permission or non-permission of lighting of the LEDs 110R and 110L on the other side, and monitor the lighting state of the LEDs by the respective monitor circuits 140L and 140R. Therefore, forcible lights-out of the LEDs 110L and 110R can be implemented without requiring control of the master device 210 when abnormality occurs.

<Flowchart>

Figure 4:
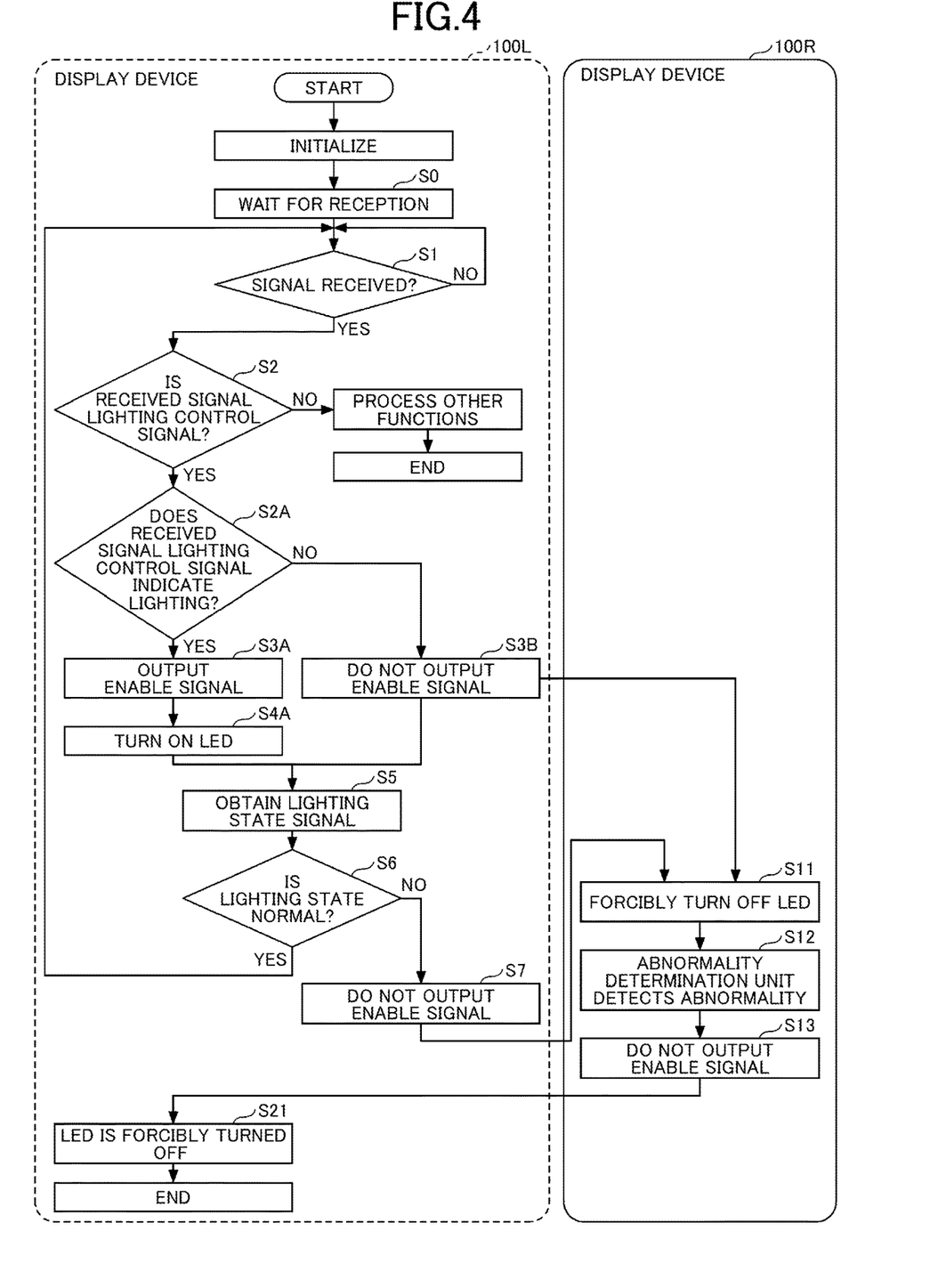
FIG. 4 is a flow chart illustrating processing executed by the display devices 100L and 100R of the display system 100S.

FIG. 4 is a flow chart illustrating processing executed by the display devices 100L and 100R of the display system 100S. In FIG. 4, in order to make the overall flow easier to understand, operations other than those executed by the MCUs 150L and 150R are added and described. In addition, here, although the display device 100L will be described as the main component, the same applies to the case of the display device 100R being the main component.

Immediately after the ignition of the vehicle is turned on, the display devices 100L and 100R are initialized, and the display device 100L is in a state of waiting for receiving a lighting control signal from the master device 210 (Step S0).

In the initialization, the display devices 100L and 100R and the display system 100S are initialized, and the display devices 100L and 100R and the display system 100S are confirmed to be free of abnormality. In the case of no abnormality, the MCU 150L of the display device 100L and the MCU 150R of the display device 100R output enable signals to each other, in order to permit the power supply to the LED 110R and the LED 110L.

The MCU 150L of the display device 100L determines whether a signal from the master device 210 is received (Step S1).

The MCU 150L determines whether the received signal is a lighting control signal (Step S2).

If the MCU 150L determines that the received signal is a lighting control signal (YES at S2), the MCU 150L further determines whether the received lighting control signal is a signal to command lighting of the LED 110L (Step S2A).

If the MCU 150L determines that the received signal is a lighting control signal to command lighting (YES at S2A), the permission control unit 153L of the display device 100L causes the enable signal output unit 155L to output an enable signal (Step S3A). In the case where the enable signal has already been output, the enable signal is continuously output. Note that at this time, it has been determined by the abnormality determination unit 152L that the lighting state of the LED 100L is not abnormal.

The drive control unit 151L sets the duty ratio of the PWM, based on the lighting control signal received from the master device 210, and executes lighting of the LED 110L based on the PWM driving (Step S4A). In the case where the PWM driving of the LED 110L has been already executed, the PWM driving is executed continuously.

The abnormality determination unit 152L obtains a lighting state signal from the monitor circuit 140L (Step S5).

Based on the lighting state signal, the abnormality determination unit 152L determines whether the lighting state of the LED 110L is normal (Step S6).

If the abnormality determination unit 152L determines that the lighting state of the LED 110L is normal (YES at S6), the process returns to the state of waiting for receiving a lighting control signal from the master device 210 (Step S0). On the other hand, if it is determined that the abnormality determination unit 152L is abnormal (NO at S6), the permission control unit 153L of the display device 100L prevents the enable signal output unit 155L from outputting the enable signal (Step S7).

Note that if it is determined at Step S2 that the signal received by the MCU 150L is not a lighting control signal (NO at S2), another function different from lighting or lights-out of the display units 101L and 101R of the display devices 100L and 100R is processed. The processing of another function may be any processing of a function related to control of the vehicle.

In addition, if it is determined at Step S2A that the signal received by the MCU 150L is a lighting control signal and is a signal to command lights-out (NO at S2A), the permission control unit 153L of the display device 100L prevents the enable signal output unit 155L from outputting the enable signal (Step S3B). If the enable signal has been already prevented from outputting, the enable signal is not continuously prevented from outputting. Note that at this time, it has been determined by the abnormality determination unit 152L that the lighting state of the LED 100L is not abnormal.

At Steps S3B and S7, the enable signal output unit 155L of the display device 100L does not output the enable signal; therefore, the power supply from the power control circuit 120R to the LED 110R of the display device 100R stops, and the LED 110R is forcibly turned out (Step S11).

By having the LED 110R of the display device 100R forcibly turned out at Step S11, the abnormality determination unit 152R detects abnormality because even though the MCU 150R of the display device 100R recognizes that the lighting state is normal, the LED 110R is in the lights-out state (Step S12).

The display device 100R informs the display device 100L that the lighting state of the LED 110R is abnormal. Specifically, the permission control unit 153R turns off the transistor 156R of the enable signal output unit 155R, to prevent the enable signal output unit 155R from outputting the enable signal (Step S13).

At Step S13, the enable signal output unit 155R of the display device 100R does not output the enable signal; therefore, the power supply from the power control circuit 120L to the LED 110L of the display device 100L stops, and the LED 110L is forcibly turned out (Step S21). Thus, the series of processing ends.

Note that in the case where the LEDs 110L and 110R are forcibly turned out, for example, the ignition of the vehicle may be turned off once, and then turned on again to initialize the display device and displaying, and in order to enable power to be supplied to the LEDs 110L and 110R, the permission control units 153L and 153R may cause the enable signal output units 155L and 155R to output enable signals and to transition to a state of waiting for receiving a lighting control signal from the master device 210 (Step S0). In addition, for example, if no abnormality occurs after a predetermined period of time (e.g., 10 seconds) has elapsed, the permission control units 153L and 153R may cause the enable signal output units 155L and 155R to output enable signals so that power can be supplied to the LEDs 110L and 110R.

<Effects>

As above, the display device 100L includes the power control circuit 120L that controls the power supply to the LED 110L, the lighting control unit (the lighting control circuit 130L and the drive control unit 151L) that controls the lighting of the LED 110L, the monitor circuit 140L that monitors the lighting state of the LED 110L, the abnormality determination unit 152L that determines abnormality in the lighting state of the LED 110L based on the output of the monitor circuit 140L, and the permission control unit 153L that controls the permission or non-permission of the power supply to the LED 110R of the display device 100R based on the determination result of the abnormality determination unit 152L. Therefore, based on a determination result of abnormality in the lighting state of the LED 110L, permission or non-permission of the power supply to the LED 110R can be controlled. In addition, the same applies to the display device 100R.

Therefore, the display devices 100L and 100R, the display system 100S, the method of controlling display devices 100L and 100R, and the method of controlling the display system 100S can be provided that can suppress erroneous lighting by controlling lighting permission or non-permission of the light-emitting diodes that illuminate the display units with each other in the two display devices 100L and 100R that are capable of illuminating the two display units 101L and 101R arranged in the steering wheel 10, respectively.

In addition, the permission control unit 153L disables the power supply to the LED 110R in the case where a determination result of the abnormality determination unit 152L indicates abnormality in the lighting state of the LED 110L (on the self-side), and thereby, can forcibly turn the LED 110R of the display device 100R out (on the other side). The same applies to the display device 100R. Therefore, the forcible lights-out of the LEDs 110L and 110R upon abnormality can be quickly implemented without using control of the master device 210.

In addition, the power control circuit 120L has the transistor 121L that controls the power supply to the LED 110L on the current supply path that supplies a current to the LED 110L, can switch the transistor 121L between on and off according to permission or non-permission of the power supply from the display device 100R, and can control the power supply securely. The same applies to the power control circuit 120R. Therefore, these circuits can control each other for lighting permission, and securely control the power supply to the LEDs 110L and 110R.

In addition, the lighting control unit of the display device 100L has the MOSFET 131L connected in series to the LED 110L on the current supply path that supplies a current to the LED 110L, and the drive control unit 151L that executes lighting control of the LED 110L by driving the MOSFET 131L. The same applies to the display device 100R. Therefore, when power is being supplied to the LEDs 110L and 110R, the MOSFETs 131L and 131R can securely execute lighting control of the LEDs 110L and 110R.

In addition, the drive control unit 151L can adjust the duty ratio when PWM driving the LED 110L. The same applied to the drive control unit 151R. Therefore, the display devices 100L and 100R that are capable of controlling brightness, lighting, and lights-off of the LEDs 110L and 110R, can be provided.

In addition, the display device 100L has the same configuration as the display device 100R, and hence, can execute indirect mutual monitoring by executing mutual lighting permission control; therefore, the display devices 100L and 100R, the display system 100S, the method of controlling the display devices 100L and 100R, and the method of controlling the display system 100S can be provided, that can suppress erroneous lighting more precisely without intervention of the master device, and quickly turn the light-emitting diodes out forcibly.

As above, the display device, the display system, the method of controlling the display device, and the method of controlling the display system according to the illustrative embodiments in the present disclosure have been described; not that the present disclosure is not limited to the specifically disclosed embodiments and various modifications and alterations can be made without departing from the scope of the claims.

What is claimed is:

1. A display device that is used among a first display device and a second display device arranged on a steering wheel as the first display device, the display device comprising:
   a first light emitting diode configured to illuminate a first display;
   a first power control circuit configured to control power supply to the first light emitting diode;
   a first lighting control circuit configured to execute lighting control of the first light emitting diode;
   a first monitor circuit configured to monitor a first lighting state of the first light emitting diode; and
   first control circuitry including a memory and a processor, configured to execute
   determining, based on an output of the first monitor circuit, whether the first lighting state is abnormal, and
   controlling permission or non-permission of power supply to a second light-emitting diode of a display device that is used as the second display device, based on a determination result of the determining.

2. The display device as claimed in claim 1, wherein the first control circuitry does not permit the power supply to the second light-emitting diode of the display device that is used as the second display device, in response to the determination result indicating that the first lighting state is abnormal.

3. The display device as claimed in claim 1, wherein the first power control circuit includes a first power control element configured to control the power supply to the first light-emitting diode, on a first current supply path to supply a current to the first light-emitting diode.

4. The display device as claimed in claim 1, wherein the first lighting control circuit includes a first lighting switching element connected in series to the first light-emitting diode on a first current supply path to supply a current to the first light-emitting diode, and
   wherein the first control circuitry is further configured to execute lighting control of the first light-emitting diode by driving the first lighting switching element.

5. The display device as claimed in claim 4, wherein the lighting control of the first light-emitting diode is capable of adjusting a duty ratio upon driving the first lighting switching element by pulse width modulation.

6. The display device as claimed in claim 1, having a same configuration as the display device that is used as the second display device.

7. A display system including a first display device and a second display device arranged on a steering wheel, wherein the first display device includes:
   a first light emitting diode configured to illuminate a first display;
   a first power control circuit configured to control power supply to the first light emitting diode;
   a first lighting control circuit configured to execute lighting control of the first light emitting diode;
   a first monitor circuit configured to monitor a first lighting state of the first light emitting diode; and
   first control circuitry including a memory and a processor, configured to execute
   determining, based on an output of the first monitor circuit, whether the first lighting state is abnormal, and
   controlling permission or non-permission of power supply to a second light-emitting diode of the second display device, based on a determination result of the determining executed by the first control circuitry, and wherein the second display device includes:

the second light emitting diode configured to illuminate a second display;

a second power control circuit configured to control the power supply to the second light emitting diode;

a second lighting control circuit configured to execute lighting control of the second light emitting diode;

a second monitor circuit configured to monitor a second lighting state of the second light emitting diode;

second control circuitry including a memory and a processor, configured to execute determining, based on an output of the second monitor circuit, whether the second lighting state is abnormal, and controlling permission or non-permission of the power supply to the first light-emitting diode of the first display device, based on a determination result of the determining executed by the second control circuitry.

8. The display system as claimed in claim 7, wherein the first control circuitry does not permit the power supply to the second light-emitting diode of the second display device, in response to the determination result indicating that the first lighting state is abnormal, and the second control circuitry does not permit the power supply to the first light-emitting diode of the first display device, in response to the determination result indicating that the second lighting state is abnormal.

9. A method of controlling a display device that is used among a first display device and a second display device arranged on a steering wheel as the first display device, wherein the display device includes:

a first light emitting diode configured to illuminate a first display;

a first power control circuit configured to control power supply to the first light emitting diode;

a first lighting control circuit configured to execute lighting control of the first light emitting diode;

a first monitor circuit configured to monitor a first lighting state of the first light emitting diode; and first control circuitry including a memory and a processor, the method of controlling the display device, comprising:

determining, executed by the first control circuitry, based on an output of the first monitor circuit, whether the first lighting state is abnormal; and controlling, executed by the first control circuitry, permission or non-permission of power supply to the second light-emitting diode of the display device that is used as the second display device, based on a determination result of abnormality in the first lighting state.

* * * * *